United States Patent [19]
Berstis

[11] Patent Number: 6,144,367
[45] Date of Patent: *Nov. 7, 2000

[54] METHOD AND SYSTEM FOR SIMULTANEOUS OPERATION OF MULTIPLE HANDHELD CONTROL DEVICES IN A DATA PROCESSING SYSTEM

[75] Inventor: Viktors Berstis, Austin, Tex.

[73] Assignee: International Business Machines Corporation, Armonk, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 08/824,532

[22] Filed: Mar. 26, 1997

[51] Int. Cl.$^7$ ............................................. G09G 5/09
[52] U.S. Cl. .................. 345/158; 74/471 XY; 463/39; 340/825.69; 341/173
[58] Field of Search ..................... 345/157, 158, 345/161; 74/471 XY; 463/38, 39; 340/825.69, 825.72; 341/173, 176

[56] References Cited

U.S. PATENT DOCUMENTS

| | | | |
|---|---|---|---|
| 4,111,421 | 9/1978 | Mierzwinski | 345/158 |
| 4,313,227 | 1/1982 | Eder | 455/617 |
| 4,390,877 | 6/1983 | Curran | 340/825.72 |
| 4,531,740 | 7/1985 | Green et al. | 273/148 B |
| 4,565,999 | 1/1986 | King et al. | 345/158 |
| 4,578,674 | 3/1986 | Baker et al. | 340/710 |
| 4,814,552 | 3/1989 | Stefik et al. | 178/18 |
| 4,924,216 | 5/1990 | Leung | 463/38 |
| 4,988,981 | 1/1991 | Zimmerman et al. | 340/709 |
| 5,023,943 | 6/1991 | Heberle | 455/603 |
| 5,098,110 | 3/1992 | Yang | 273/438 |
| 5,317,752 | 5/1994 | Jewett et al. | 395/750 |
| 5,341,167 | 8/1994 | Guichard et al. | 348/14 |
| 5,423,227 | 6/1995 | Polaert et al. | 73/862.044 |
| 5,432,932 | 7/1995 | Chen et al. | 395/673 |
| 5,435,573 | 7/1995 | Oakford | 273/438 |
| 5,461,292 | 10/1995 | Zondlo | 318/587 |
| 5,532,753 | 7/1996 | Buchner et al. | 348/569 |
| 5,554,980 | 9/1996 | Hashimoto et al. | 340/825.72 |
| 5,605,505 | 2/1997 | Han | 463/39 |
| 5,606,659 | 2/1997 | Maloy | 395/183.01 |
| 5,610,665 | 3/1997 | Berman | 348/564 |
| 5,702,305 | 12/1997 | Norman et al. | 463/42 |
| 5,707,160 | 1/1998 | Bowen | 400/472 |

FOREIGN PATENT DOCUMENTS 6238387 9/1988 Japan.

OTHER PUBLICATIONS

"Remote Key Input to Personal Computer," IBM Technical Disclosure Bulletin, vol. 29, No. 9, Feb. 1987.

*Primary Examiner*—Daniel J. Wu
*Attorney, Agent, or Firm*—Jeffrey S. LaBaw; David H. Judson

[57] ABSTRACT

A method and system for controlling a display of a data processing system uses first and second wireless position control devices, and a control base unit. The first wireless position control device includes an acoustical transducer for transmitting a first ultrasonic carrier signal upon which X-Y position control and/or action control signals generated by the device are imposed. A second wireless position control device includes and acoustical transducer for transmitting a second ultrasonic carrier signal upon which X-Y position control and/or other action control signals generated by the second control device are imposed. The first and second ultrasonic carrier signals have different frequencies. The control base is associated with the data processing system and includes circuitry for receiving and differentiating the first and second ultrasonic carrier signals to generate decoded display control signals. The display control signals are then used to drive the display device. Two users may thus control the display device simultaneously.

16 Claims, 4 Drawing Sheets

METHOD AND SYSTEM FOR SIMULTANEOUS OPERATION OF MULTIPLE HANDHELD CONTROL DEVICES IN A DATA PROCESSING SYSTEM

BACKGROUND OF THE INVENTION

1. Technical Field

The present invention relates in general to a method and system for data processing and in particular to an improved method and system of user interface to a data processing system. Still more particularly, the present invention relates to an improved method and system for simultaneous operation of multiple display control devices, such as a pair of joysticks.

2. Description of the Related Art

There has been great interest in providing Internet access at minimal economic cost. While most computers now are pre-configured for Internet access, a significant percentage of households still do not have a personal computer. Thus, it has now been proposed to provide a data processing system that, much like a VCR, may be connected to a television set and used in lieu of a personal computer to provide World Wide Web access through a conventional remote control device associated with the system unit. Such a system enables the television to become, in effect, a "Web" appliance. The viewer can rapidly switch between conventional television and Internet access using the remote control unit. All of the conventional "Internet" access tools and navigational functions are preferably "built-in" to the system and thus hidden to the user.

The remote control unit used to control the Web appliance is battery-powered and will typically include an infrared source, such as a light emitting diode (LED), which cooperates with a phototransistor in a receiver unit to effect the transfer of control signals for the appliance. An infrared control unit, however, is unsuitable for use in providing control of computer games, which use joysticks or glove control devices, because many of these games involve multiple players. Multiple infrared remote devices interfere with each other when used in the same physical environment. The infrared source also causes a significant power drain when used continuously, thus reducing battery life. As a result, it has been necessary to hard-wire the game control devices directly into the computer. Such wiring, however, is quite cumbersome and does not present an acceptable solution. This is especially true in the context of a Web appliance, where it is desired to reduce the complexity of the device as well as the machine interaction required by the user.

SUMMARY OF THE INVENTION

It is therefore a principal object of the present invention to provide a method and system for wireless display control in a personal computer.

It is still another principal object to provide a control system for computer games that includes a pair of wireless remote control devices adapted to be used by two different people simultaneously and without interference.

It is a further object of the invention to enhance the control of a data processing system using ultrasonic wireless control devices "tuned" to different, non-interfering frequencies.

Another object of the present invention is to enhance the entertainment value of a computer system by obviating wired control devices.

Still another object of the invention is to provide a simple and cost-effective alternative to infrared control devices in a personal computer.

Yet another more general object is to provide an improved method and system of user interface within a data processing system.

These and other objects are provided in a system for controlling a display of a data processing system. The system comprises first and second wireless position control devices, such as a pair of joystick controls, and a control base unit associated with a data processing system, such as a personal computer. The first wireless position control device includes an acoustical transducer for transmitting a first ultrasonic carrier signal upon which X-Y position and/or other action control signals generated by the device are imposed. A second wireless position control device includes an acoustical transducer for transmitting a second ultrasonic carrier signal upon which X-Y position and/or other action control signals generated by the second control device are imposed. The first and second ultrasonic carrier signals have different frequencies that are non-interfering within the physical constraints of the system environment or the display characteristics of the screen window. The control base associated with the data processing system includes appropriate circuitry for receiving and differentiating the first and second ultrasonic carrier signals to generate decoded X-Y position control signals and/or other action control signals. The decoded X-Y position control signals and/or the action control signals are then used to drive the display device. In particular, the position control and action control signals received from the first wireless position control device cause a first action and/or event on the display, while the position control and action control signals received from the second wireless position control device cause a second action and/or event on the display. The first and second actions or events facilitate the play of some multiplayer, interactive game or exercise.

In accordance with a more general aspect of the invention, a method of controlling a display of a data processing system is also provided. According to the method, first and second ultrasonic carrier signals upon which control signals are imposed are transmitted from respective first and second handheld, wireless control devices. Each of the devices is battery-powered. Preferably, the control signals include X-Y position control signals, action control signals, or both. At a receiver, the first and second ultrasonic carrier signals are differentiated and processed to generate display control signals. The display control signals are then used to drive a display device of a data processing system. In this manner, a pair of users of the first and second wireless control devices may interact with each other without interference.

The foregoing has outlined some of the more pertinent objects and features of the present invention. These objects should be construed to be merely illustrative of some of the more prominent features and applications of the invention. Many other beneficial results can be attained by applying the disclosed invention in a different manner or modifying the invention as will be described. Accordingly, other objects and a fuller understanding of the invention may be had by referring to the following.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

A representative computer environment in which the present invention may be implemented is a "Web" appliance. At the outset, although the invention is illustrated in the context of a "Web" appliance, the features of the invention may be implemented in any data processing system, or even in a standalone gaming device, irrespective of the actual computer, network or other system environment.

Figure 1A:
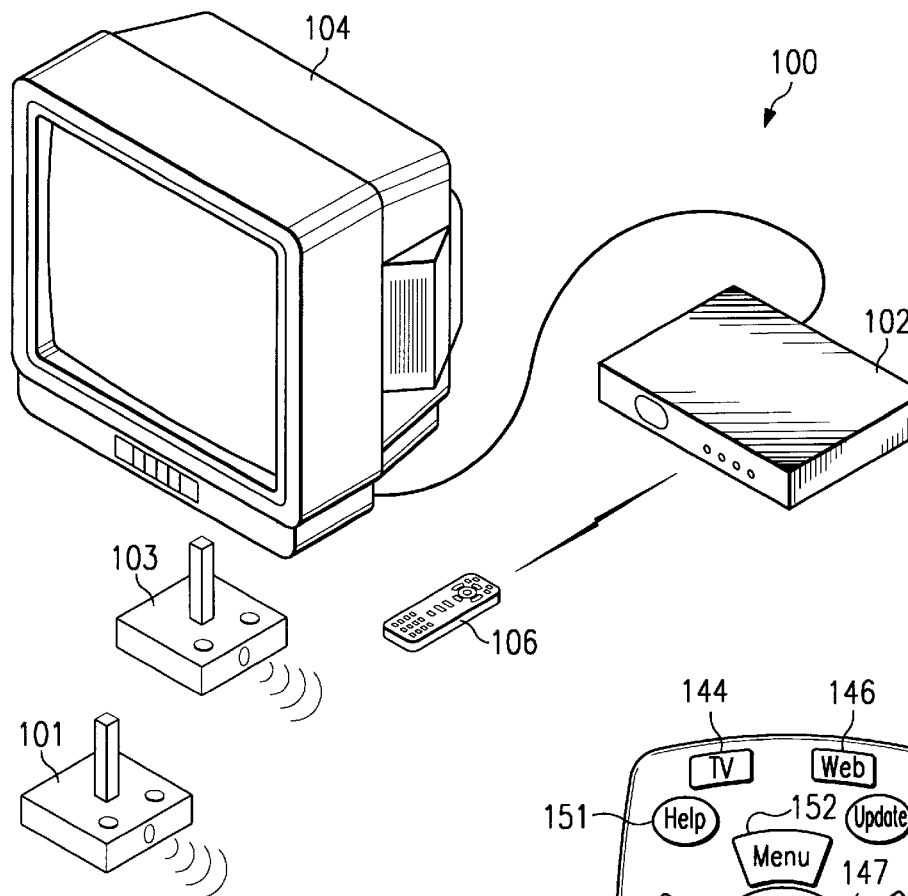
FIG. 1A is a pictorial representation of a data processing system unit connected to a conventional television set to form a "Web" appliance.

A representative data processing system or so-called "Web appliance" is illustrated in FIGS. 1A–1D and 4. FIG. 1A is a pictorial representation of the data processing system as a whole. Data processing system 100 in the depicted example provides, with minimal economic costs for hardware to the user, access to the Internet. Data processing system 100 includes a data processing unit 102. Data processing unit 102 is preferably sized to fit in typical entertainment centers and provides all required functionality, which is conventionally found in personal computers, to enable a user to "browse" the Internet. Additionally, data processing unit 102 may provide other common functions such as serving as an answering machine or receiving facsimile transmissions.

Data processing unit 102 is connected to television 104 for display of graphical information. Television 104 may be any suitable television, although color televisions with an S-Video input will provide better presentations of the graphical information. Data processing unit 102 may be connected to television 104 through a standard coaxial cable connection. A remote control unit 106 allows a user to interact with and control data processing unit 102. Remote control unit 106 emits infrared (IR) signals, preferably modulated with a control code different than the codes used to control the normal television, stereo, and VCR infrared remote control devices, in order to avoid interference. Remote control unit 106 provides the functionality of a pointing device (such as a mouse, glidepoint, trackball or the like) in conventional personal computers, including the ability to move a cursor on a display and select items.

According to the present invention, and as seen in FIG. 1A, one or more wireless remote control devices 101 and 103 are also provided for use with the data processing system. Each of the remote control devices 101 and 103 generates control signals that are imposed on acoustical, as compared to infrared light, signals. Preferably, the devices 101 and 103 use carrier signals in the ultrasonic region, which is a frequency range generally considered to be about 20 khz. An exemplary carrier frequency is 40 khz for one of the devices and 60 khz for the other device, so that the devices do not interfere with each other in use. Use of ultrasonic carrier signals also ensures that the control signals generated by the devices 101 and 103 do not interfere with the control signals generated by the remote control unit 106, any infrared keyboard, or other control device.

Figure 1D:
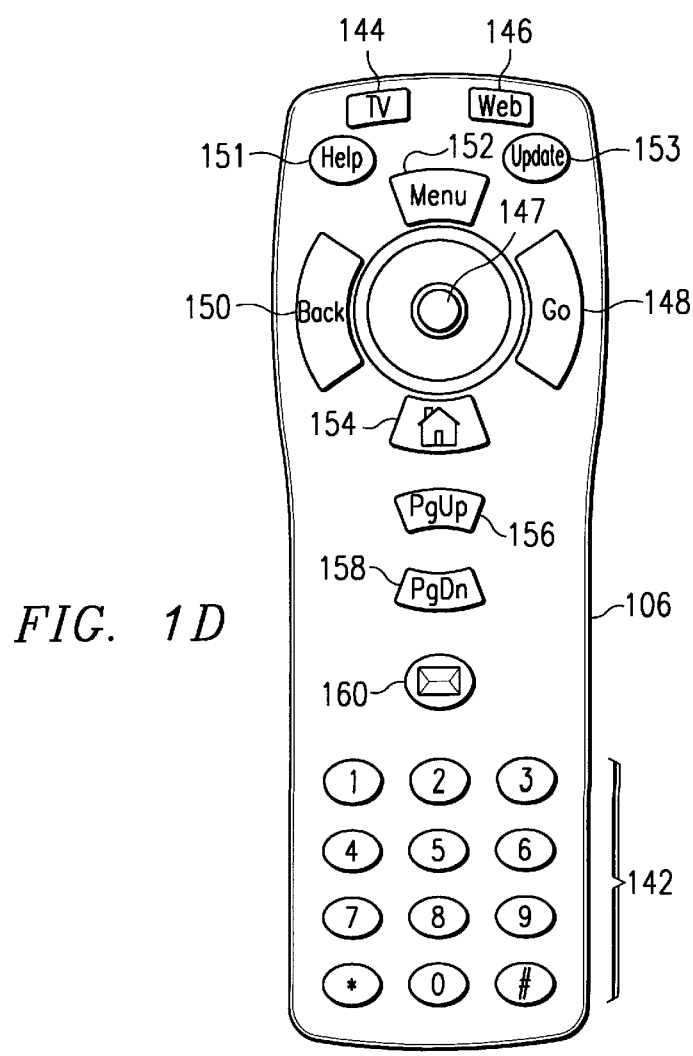
FIG. 1D is a pictorial representation of a remote control unit associated with the data processing system unit.
Figure 1B:
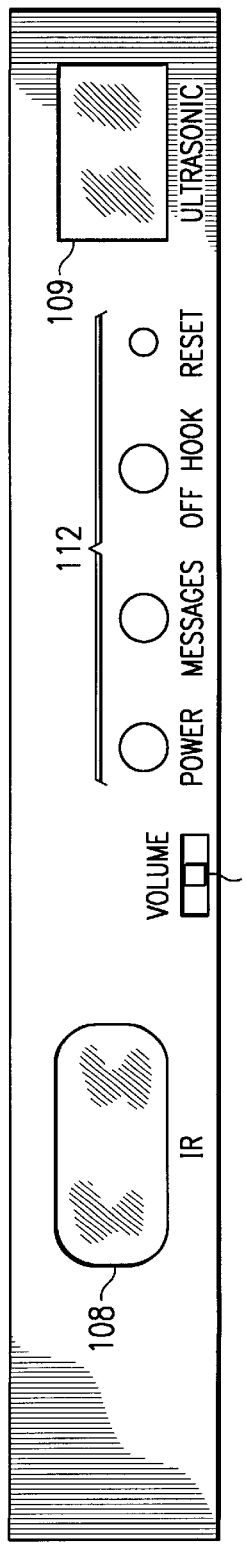
FIG. 1B is a pictorial representation of a front panel of the data processing system unit.

FIG. 1B is a pictorial representation of the front panel of data processing unit 102. The front panel includes an infrared window 108 for receiving signals from remote control unit 106 and for transmitting infrared signals. The front panel also includes an acoustical transducer window 109 for receiving control signals from one or more wireless control devices, as will be described below. Data processing unit 102 may transmit infrared signals to be reflected off objects or surfaces, allowing data processing unit 102 to automatically control television 104 and other infrared remote controlled devices. Volume control 110 permits adjustment of the sound level emanating from a speaker within data processing unit 102 or from television 104. A plurality of light-emitting diode (LED) indicators 112 provide an indication to the user of when data processing unit 102 is on, whether the user has messages, whether the modem/phone line is in use, or whether data processing unit 102 requires service.

Figure 1C:
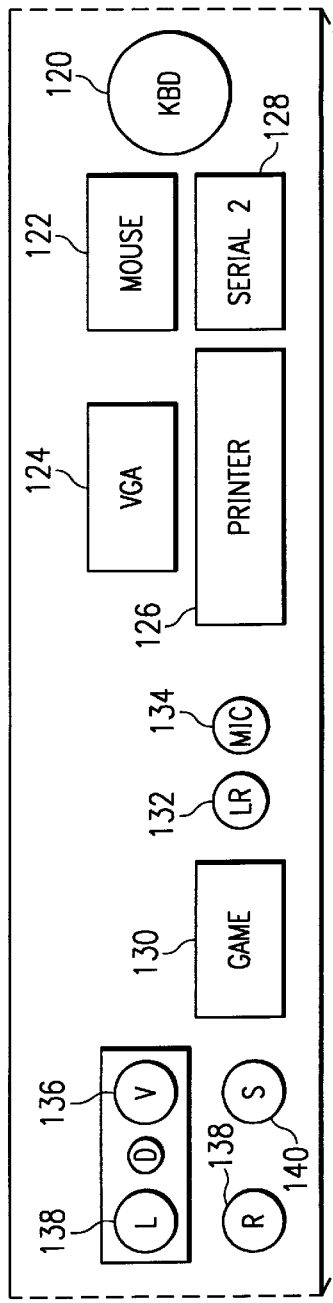
FIG. 1C is a pictorial representation of a rear panel of the data processing system unit.
Figure 1C:
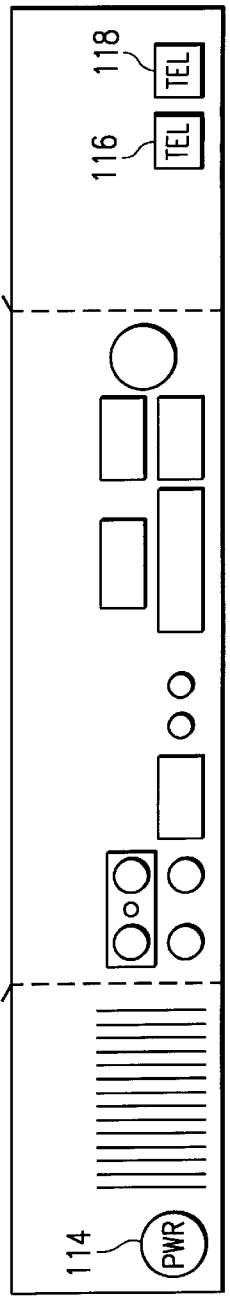

FIG. 1C is a pictorial representation of the rear panel of data processing unit 102. A three wire (ground included) insulated power cord 114 passes through the rear panel. Standard telephone jacks 116 and 118 on the rear panel provide an input to a modem from the phone line and an output to a handset (not shown). The real panel also provides a standard computer keyboard connection 120, mouse port 122, computer monitor port 124, printer port 126, and an additional serial port 128. These connections may be employed to allow data processing unit 102 to operate in the manner of a conventional personal computer. Game port 130 on the rear panel provides a wire connection for a joystick or other gaming control device (glove, etc.) although, as noted above and as described below, the front panel of the device includes the window 109 for receiving acoustic control signals. Infrared extension jack 132 allows a cabled infrared LED to be utilized to transmit infrared signals. Microphone jack 134 allows an external microphone to be connected to data processing unit 102.

Video connection 136, a standard coaxial cable connector, connects to the video-in terminal of television 104 or a video cassette recorder (not shown). Left and right audio jacks 138 connect to the corresponding audio-in connectors on television 104 or to a stereo (not shown). If the user has S-Video input, then S-Video connection 140 may be used to connect to television 104 to provide a better picture than the composite signal. If television 104 has no video inputs, an external channel 3/4 modulator (not shown) may be connected in-line with the antenna connection.

FIG. 1D is a pictorial representation of remote control unit 106. Similar to a standard telephone keypad, remote control unit 106 includes buttons 142 for Arabic numerals 0 through 9, the asterisk or "star" symbol (*), and the pound sign (#). Remote control unit also includes "TV" button 144 for selectively viewing television broadcasts and "Web" button 146 for initiating "browsing" of the Internet or "off-line" browsing of the hard drive. For example, pressing "Web"

button 146 will cause data processing unit 102 to initiate modem dial-up of the user's Internet service provider and display the start-up screen for an Internet browser.

A pointing device 147, which is preferably a trackpoint or "button" pointing device, is included on remote control unit 106 and allows a user to manipulate a cursor on the display of television 104. "Go" and "Back" buttons 148 and 150, respectively, allow a user to select an option or return to a previous selection. "Help" button 151 causes context-sensitive help to be displayed or otherwise provided. "Menu" button 152 causes a context-sensitive menu of options to be displayed, and "Update" button 153 will update the options displayed based on the user's input, while home button 154 allows the user to return to a default display of options. "PgUp" and "PgDn" buttons 156 and 158 allows the user to change the context of the display in display-sized blocks rather than by scrolling. The message button 160 allows the user to retrieve messages.

In addition to remote control unit 106, an infrared keyboard (not shown) with an integral pointing device may be used to control data processing unit 102. The keyboard may communicate with the data processing unit via control commands impressed upon an ultrasonic carrier signal. The integral pointing device is preferably a trackpoint or button type of pointing device. A wired keyboard (also not shown) may also be used through keyboard connection 120, and a wired pointing device such as a mouse or trackball may be used through mouse port 122. When a user has one or more of the remote control unit 106, infrared keyboard, wired keyboard and/or wired pointing device operable, the active device may lock out all others until a prescribed period of inactivity has passed.

Figure 2:
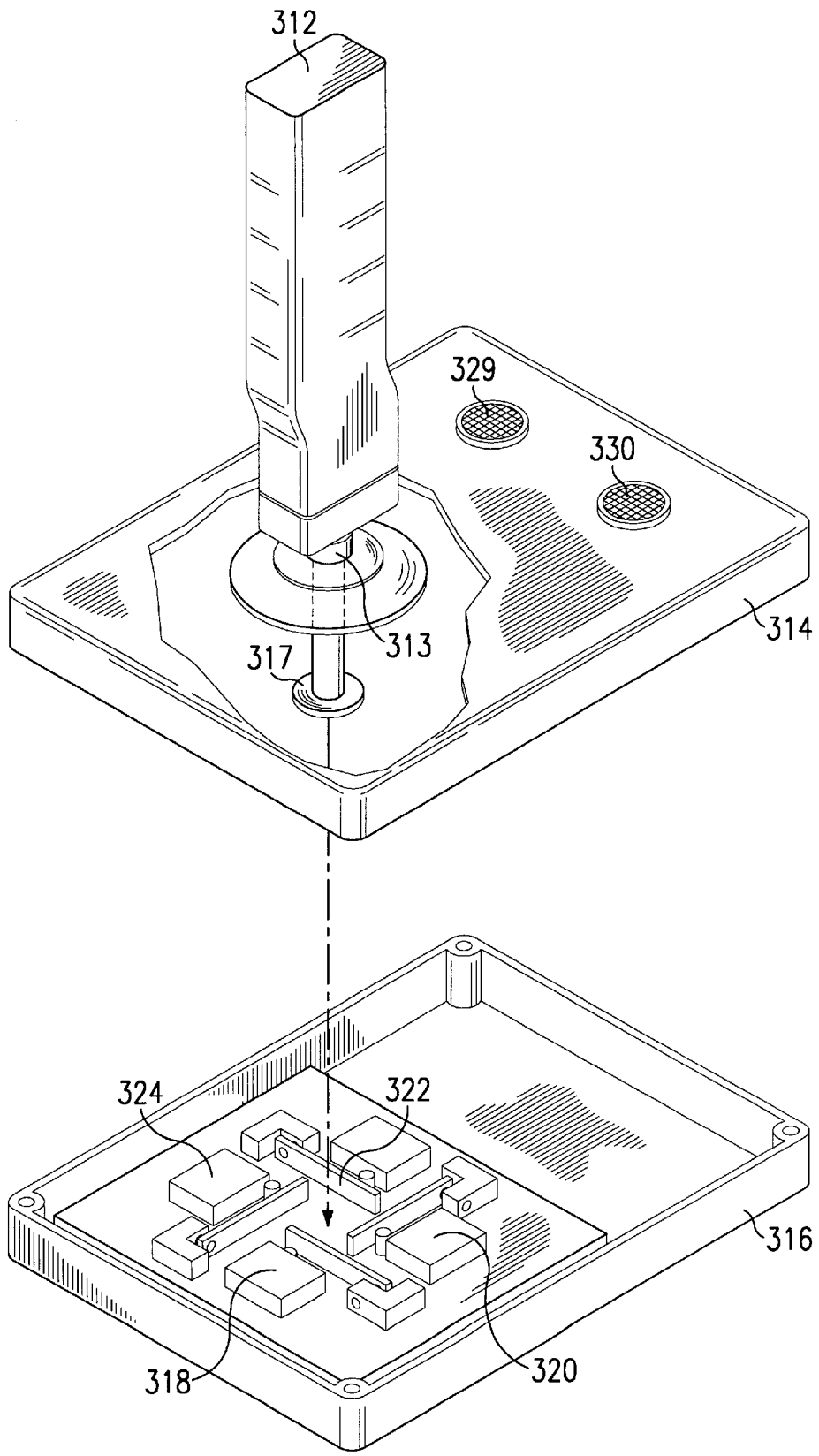
FIG. 2 is a perspective view, partially exploded, of one of the wireless joystick devices of the Web appliance.

As noted above, one or more wireless remote control devices 101 and 103 are provided for use with the data processing system. A representative wireless control device is a joystick, which is illustrated in simplified form in FIG. 2. As is well-known, a joystick is useful for inputting information into a computer or to control the movement of a figure or object in a video game. Joystick 310 includes a handle 312 pivotally mounted in a swivel 313 in an upper housing portion 314. The upper housing 314 is attached to a lower housing 316. The handle 312 facilitates manual input of coordinate information to the computer or video game with the handle being movable to a position in two orthogonal directions to control the input of such coordinate information. To this end, handle 312 is adapted to be manually manipulated to move or pivot in any direction about the swivel 313 to produce different movements of the control 317, which thus moves in an X-Y coordinate plane. When the handle is manipulated, control 317 makes contact with switches 318, 320, 322 and 324, to produce digital information. The switches are spaced 90 degrees apart, representing movement of the handle 312 in the +x, −x, +y and −y directions of the X-Y coordinate plane. Preferably, the actual joystick does not use physical "switch" devices such as represented in FIG. 2; rather, the joystick position is determined using a pair of variable resistors (or perhaps capacitors) set up in a gimbel mechanism. The two variable resistors measure the X and Y position of the joystick and generate X and Y values that are proportional to the joystick position in the X-Y plane. These latter signals are then sent to the computer. The joystick typically includes operator-actual firing buttons 329 and 330 which, when pressed, control or activate other switches which send signals to the computer or game to initiate an event. Buttons 329 and 330 thus generate action control signals for effecting an event or action on the display screen.

Figure 3:
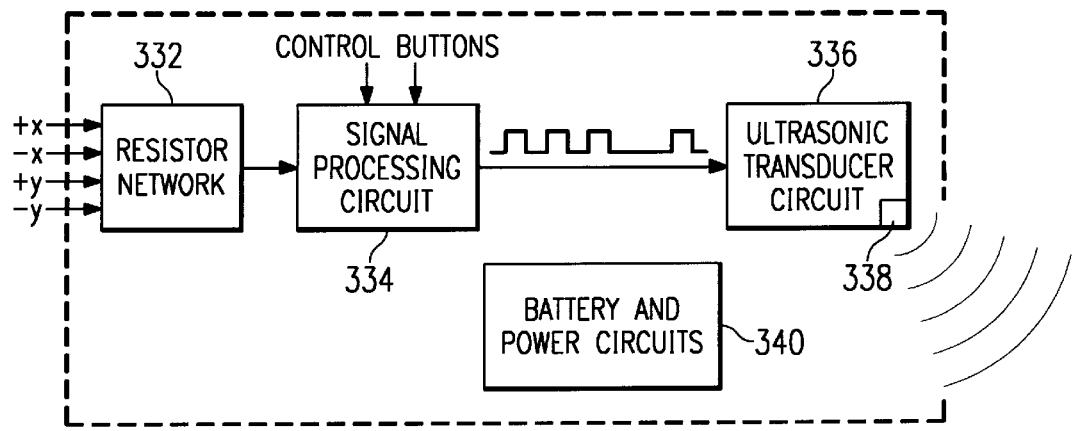
FIG. 3 is a schematic diagram of the electronic circuitry of the wireless joystick device of FIG. 2.

FIG. 3 is a simplified schematic diagram of the electrical circuitry of the joystick of FIG. 2. Resistor network 332 represents the pair of variable resistors discussed above. The resistor network output is supplied to an signal processing circuit 334, which also receives the outputs of the firing buttons 329 and 330. Circuit 334 outputs a pulse signal with a given number of bits (e.g., 12 bits) representing the X-Y position value and a given number of bits (e.g., 4 bits) representing the button values. The pulse signal may also include a parity bit. The pulse signal is then supplied to an ultrasonic transducer circuit 336, in which it is used to modulate an ultrasonic carrier signal generated by a ceramic transducer 338. The circuit also includes a suitable battery and associated circuitry 340 for powering the device.

In operation, manipulation of the joystick handle provides corresponding X-Y movement of a cursor, graphical pointer or other game display element on the display device which, in this case, is the television monitor. Alternatively, the display device is a conventional computer monitor. Likewise, actuation of a control button on the joystick causes some display element to change state. Typically, the joysticks 101 and 103 are used in conjunction with some program source, such as a computer game or other software application running on the machine.

The X-Y position control signals and the action control signals are impressed upon an ultrasonic carrier signal by an ultrasonic transducer in the joystick. The transducer is preferably a piece of ceramic that vibrates at a first carrier frequency. It is modulated by the X-Y position control signals and/or any action control signals generated by actuation of the buttons. The control signals are then transmitted over the air to the base unit, or the base unit may poll the device to determine the state of the various control elements. A corresponding control device for use by another person operates in a similar manner, except that the transducer in such device is tuned to another carrier frequency so that the pair of devices may be used simultaneously.

Thus, in accordance with the present invention, each of the wireless remote control devices includes an appropriate acoustical transducer tuned to a different carrier frequency such that the pair of control devices may be used simultaneously to control graphical elements on the display. Preferably, the acoustical transducer generates an ultrasonic carrier so that the control signals are inaudible. Thus, one of ordinary skill in the art will appreciate that the joystick devices 101 and 103 may be used by two players simultaneously in order to effect changes to the display without interference with each other or with any infrared signals generated by the remote control unit 106.

Figure 4:
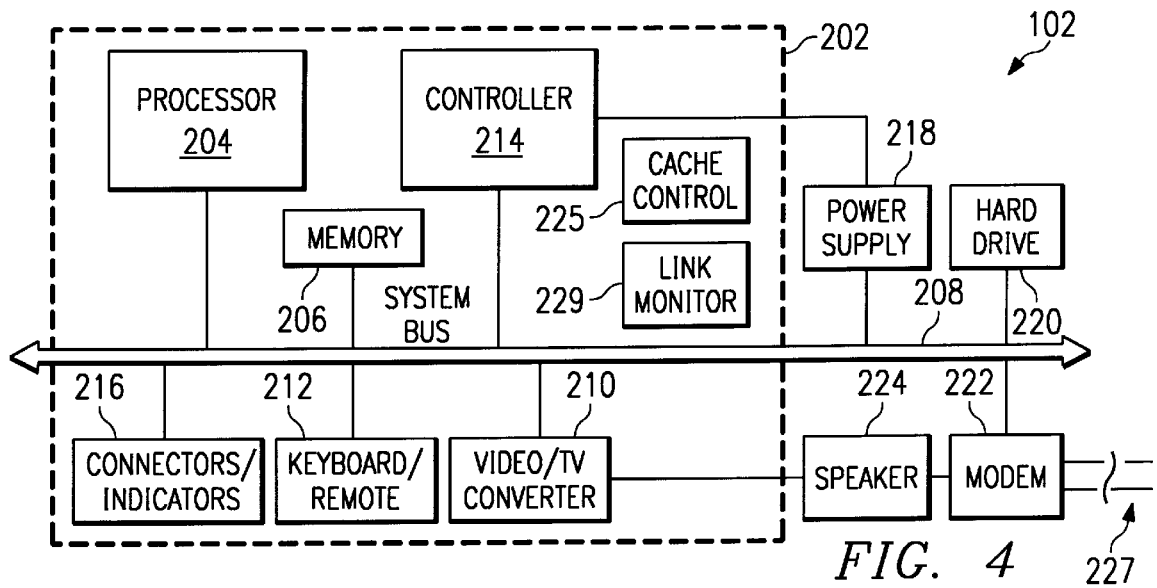
FIG. 4 depicts a block diagram of the system unit of the data processing system illustrated in FIG. 1.

Referring now to FIG. 4, a block diagram for the major components of data processing unit 102 is portrayed. As with conventional personal computers, data processing unit 102 includes a motherboard 202 containing a processor 204 and memory 206 connected to system bus 280. Processor 205 is preferably at least a 486 class processor operating at or above 100 MHz. Memory 206 may include cache memory and/or video RAM. Processor 205, memory 206, and system bus 208 operate in the same manner as corresponding components in a conventional data processing system.

Video/TV converter 210, located on motherboard 202 and connected to system bus 208, generates computer video signals for computer monitors, a composite television signal, and an S-Video signal. The functionality of Video/TV converter 210 may be achieved, for example, through a Trident TVG9685 video chip in conjunction with an Analog Devices AD722 converter chip. Video/TV converter 210 may require loading of special operating system device drivers.

Keyboard/remote control interface unit 212 on motherboard 202 receives keyboard codes through controller 214, regardless of whether a wired keyboard/pointing device or an infrared keyboard/remote control is being employed. Infrared remote control unit 106 transmits signals which are ultimately sent to the serial port as control signals generated by conventional mouse or pointing device movements. Two buttons on remote control unit 106 are interpreted identically to the two buttons on a conventional mouse, while the remainder of the buttons transmit signals corresponding to keystrokes on an infrared keyboard. Thus, remote control unit 106 has a subset of the function provided by an infrared keyboard.

Connectors/indicators 216 on motherboard 202 provide some of the connections and indicators on data processing unit 102 described above. Other connections are associated with and found on other components. For example, telephone jacks 116 and 118 are located on modem 222. The power indicator within connectors/indicators 216 is controlled by controller 214.

External to motherboard 202 in the depicted example are power supply 218, hard drive 220, modem 222 and speaker 224. Power supply 218 is a conventional power supply except that it receives a control signal from controller 214 which effects shut down of all power to motherboard 202, hard drive 220 and modem 222. In some recovery situations, removing power and rebooting is the only guaranteed method of resetting all of these devices to a known state. Thus, power supply 218, in response to a signal from controller 214, is capable of powering down and restarting data processing unit 102.

Controller 214 is preferably one or more of the 805x family controllers. Controller 214 receives and processes input from infrared remote control 106, infrared keyboard, wired keyboard, or wired mouse. When one keyboard or pointing device is used, all others are locked out (ignored) until none have been active for a prescribed period. Then the first keyboard or pointing device to generate activity locks out all others. Controller 214 also directly controls all LED indicators except that indicating modem use. As part of the failure recovery system, controller 214 specifies the boot sector selection during any power off-on cycle.

Hard drive 220 contains operating system and applications software for data processing unit 102, which preferably includes IBM DOS 7.0, a product of International Business Machines Corporation in Armonk, N.Y.; an operating system 221 such as Windows 3.1 (or higher), a product of Microsoft Corporation in Redmond, Wash.; and a browser 223 such as Netscape Navigator (Version 1.0 or higher), a product of Netscape Communications Corporation in Mountain View, Calif. Software on the hard drive 220 may also support an SMTP mechanism to provide electronic mail, an FTP mechanism to facilitate file transfers from Internet FTP sites, and other TCP/IP mechanisms, all in a known manner. Of course, the software identified above is merely representative, as other known programs may be used in the alternative or by way of addition.

Modem 222 may be any suitable modem used in conventional data processing systems, but is preferably a 33.6 kbps modem supporting the V.42bis, V.34, V.17 Fax, MNP 1–5, and AT command sets. To maintain the slim height of data processing system 102, modem 222 is preferably inserted into a slot mounted sideways on motherboard 202. Modem 222 is connected to a physical communication link 227, which, in turn, in connected or connectable to the Internet (not shown).

Figure 5:
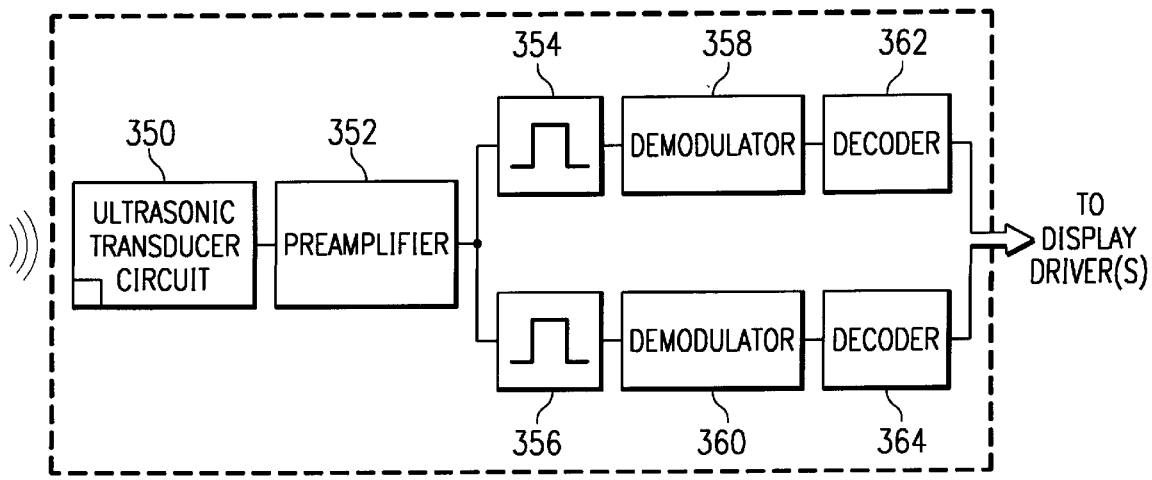
FIG. 5 is a block diagram of the receiver circuitry of the data processing system for use in receiving the control signals generated by the pair of wireless joystick devices.

Data processing unit also includes circuitry for receiving the acoustical control signals generated by the control devices 101 and 103. This circuitry is illustrated in FIG. 5. Preferably, the receiver includes an ultrasonic transducer circuit 350 that drives a selective preamplifier 352. The acoustical signals received by the transducer are converted to electrical waveforms, amplified by preamplifier 352, and then supplied to a pair of bandpass filters 354 and 356. Filter 354 is tuned to the carrier frequency of control device 101 and filter 356 is tuned to the carrier frequency of control device 103. Thus, filter 354 passes the signals generated by device 101 and filter 356 passes the signals generated by device 103, but not vice versa. The filter outputs are then passed through a pair of demodulators 358 and 360, which serve to remove the carrier signals. The demodulator outputs are then passed through decoder circuits 362 and 364 to generate the decoded display control signals used to control the display device. One of ordinary skill will appreciate that the bandpass filters, demodulators and decoder circuits, or any of them, may be implemented in whole or in part in hardware or in software.

Those skilled in the art will further recognize that the components depicted in FIGS. 1A–1D and described above may be varied for specific applications or embodiments. Such variations in which the present invention may be implemented are considered to be within the spirit and scope of the present invention. Thus, for example, the data processing system may be a personal computer such as a desktop or notebook computer, e.g., an IBM( or IBM-compatible machine running under the OS/2(operating system, an IBM ThinkPad( machine, or some other Intel x86 or Pentium(-based computer running Windows 3.1 or greater operating system.

It should thus be appreciated that the present invention provides many useful advantages. By using a pair of wireless control devices, the number of control connectors and the like is reduced, thus making the use of the Web appliance far more practical and enjoyable for inexperienced computer users. The wireless control devices operate using acoustic energy as opposed to infrared light, and thus they consume far less power than conventional infrared control devices. This is highly advantageous because such game control devices are far more often in the "on" position as opposed to being "off." Infrared devices, on the contrary, are rarely used and thus battery conservation is not a major operational criteria. The use of ultrasonic transducers in a pair of devices allows multiple devices to be used simultaneously without interference with each other or to any other infrared control device.

The control devices advantageously use existing infrared-type electronics, but replace the infrared elements (LED's and phototransistors) with ultrasound transducers tuned to different carrier frequencies. The large amplitude signals used to drive the infrared LED's (in a conventional remote control unit) are sufficient to generate ultrasonic variations of the same modulated signal. Moreover, the phototransistor already goes into a selective preamplifier at the receiving circuitry, and thus, the control signals do not need to be otherwise processed in any different manner.

Of course, one of ordinary skill will recognize that the inventive system need not be limited to merely a pair of handheld wireless devices. The system may include a plurality of such handheld devices, each "tuned" to a separate carrier frequency. Some of the plurality of devices may be joysticks, while still others are different types of control devices such as gaming gloves, pointing devices, mice, etc. Thus, the inventive techniques may be useful in facilitating simultaneous multi-user control of a display device in the context of more than just two participants. Moreover, there is no requirement that the present invention be implemented merely as a game control system, as the display device and associated control devices may be used for any purpose where it is required or desired to control display of and/or provide interactive information to multiple users. Thus, the invention has many other applications, e.g., for interactive sampling, audience participation, polling and the like, and any other uses where it is desired to provide multiple user interaction with a display device.

Another application of the present invention is to enable play of interactive games over a computer network, such as the Internet or World Wide Web. Once the data processing system described above is connected to such a network, interactive game display information would be downloaded from a server. One or more players would then use the wireless control devices in the manner described to manipulate one or more game elements, preferably as the active connection over the network is maintained. Alternatively, one user could be located at one computer and play a second user located at a second computer.

While the invention has been particularly shown and described with reference to a preferred embodiment, it will be understood by those skilled in the art that various changes in form and detail may be made therein without departing from the spirit and scope of the invention.

What is claimed is:

1. A display control system for simultaneously receiving control signals from a plurality of remote input control devices comprising:
   a first remote control device having a control element, for producing first control signals in response to manual input, and a transmitter which transmits a first carrier signal having a first frequency modulated by the first control signals;
   a second remote control device having a control element, for producing second control signals in response to manual input, and a transmitter which transmits a second carrier signal having a second frequency modulated by the second control signals;
   a receiver having a transducer for simultaneously receiving the first and second carrier signals and converting the signals into a composite electrical signal, a splitter for separating the composite electrical signal into first and second component signals having the first and a second frequencies, and first and second demodulators for deriving the first and second control signals from the first and second component signals, the first and second control signals controlling first and second display elements on a display device.

2. The display control system as described in claim 1 wherein the control element of each remote control device is movable in an X-Y coordinate plane.

3. The display control system as described in claim 1 wherein the control element of each remote control device includes means responsive to positioning of the control element for generating control signals proportional to a position of the control element in the X-Y coordinate plane.

4. The display control system as described in claim 1 wherein the control element of each remote control device includes at least one control button for generating an action control signal.

5. The display control system as described in claim 1 wherein the splitter includes:
   a first filter connected to receive the composite electrical signal and provide a first filtered signal, the first filter allowing signals having the first frequency to pass while blocking the signals of the second frequency; and
   a second filter connected to receive the composite electrical signal and provide a second filtered signal, the second filter allowing signals having the second frequency to pass while blocking the signals of the first frequency.

6. The display control system as described in claim 1 wherein the transmitter of the first and second remote control devices is a ceramic transducer producing an acoustical control signal.

7. The display control system as described in claim 1 wherein the control element of each remote control device is a joystick.

8. The display control system as described in claim 1 wherein the first and second carrier signals are ultrasonic signals.

9. The display control system as described in claim 1 wherein the receiver further includes:
   a first decoder for decoding the output of the first demodulator and providing a decoded first control signal; and
   a second decoder for decoding the output of the second demodulator and providing a decoded second control signal.

10. The receiver for simultaneously receiving control signals of at least a first and a second frequency from a plurality of remote control devices, comprising;
    a transducer for simultaneously receiving first and second carrier signals and converting the signals into a composite electrical signal;
    a splitter for separating the composite electrical signal into first and second component signals having the first and a second frequencies; and
    first and second demodulators for deriving the control signals from the first and second component signals.

11. The receiver as described in claim 10 wherein the splitter includes:
    a first filter connected to receive the composite electrical signal and provide a first filtered signal, the first filter allowing signals having the first frequency to pass while blocking the signals of the second frequency; and
    a second filter connected to receive the composite electrical signal and provide a second filtered signal, the second filter allowing signals having the second frequency to pass while blocking the signals of the first frequency.

12. The receiver as described in claim 10 wherein the transmitter of the remote control devices is a ceramic transducer producing an acoustical control signal.

13. The receiver as described in claim 10 wherein the first and second carrier signals are ultrasonic signals.

14. The receiver as described in claim 10 further including a first decoder for decoding the output of the first demodulator and providing a decoded first control signal.

15. The receiver as described in claim 10 further including a second decoder for decoding the output of the second demodulator and providing a decoded second control signal.

16. A display control system for simultaneously receiving control signals from a plurality of remote input control devices comprising:
    a first remote control device having a control element movable in an X-Y plane, for producing first control signals in response to manual input, and a transmitter which transmits a first carrier signal having a first frequency modulated by the first control signals;

a second remote control device having a control element movable in an X-Y plane, for producing second control signals in response to manual input, and a transmitter which transmits a second carrier signal having a second frequency modulated by the second control signals;

a receiver having a transducer for simultaneously receiving the first and second carrier signals and converting the signals into a composite electrical signal;

a first filter connected to receive the composite electrical signal and provide a first component signal, the first filter allowing signals having the first frequency to pass while blocking the signals of the second frequency;

a second filter connected to receive the composite electrical signal and provide a second component signal, the second filter allowing signals having the second frequency to pass while blocking the signals of the first frequency; and first and second demodulators for deriving the first and second control signals from the first and second component signals, the first and second control signals controlling first and second display elements on a display device.

* * * * *